US 8,370,928 B1

(12) United States Patent
Motwani et al.

(10) Patent No.: US 8,370,928 B1
(45) Date of Patent: Feb. 5, 2013

(54) SYSTEM, METHOD AND COMPUTER PROGRAM PRODUCT FOR BEHAVIORAL PARTITIONING OF A NETWORK TO DETECT UNDESIRABLE NODES

(75) Inventors: Rajiv Motwani, Bangalore (IN); Gerald S. Painkras, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 1289 days.

(21) Appl. No.: 11/341,929

(22) Filed: Jan. 26, 2006

(51) Int. Cl.
*G06F 11/00* (2006.01)
(52) U.S. Cl. ............ 726/22; 726/23; 726/24; 709/224; 709/245
(58) Field of Classification Search ............... 713/168, 713/181, 182, 156, 163–164; 726/22, 23–25; 709/206, 223–225
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,076,801 B2* | 7/2006 | Gong et al. | 726/11 |
| 7,150,045 B2* | 12/2006 | Koelle et al. | 726/26 |
| 7,172,118 B2* | 2/2007 | Urken | 235/386 |
| 7,177,929 B2* | 2/2007 | Burbeck et al. | 709/224 |
| 7,181,536 B2* | 2/2007 | Burbeck et al. | 709/245 |
| 7,267,544 B2* | 9/2007 | Spangrud | 431/354 |
| 7,370,358 B2* | 5/2008 | Ghanea-Hercock | 726/23 |
| 7,506,155 B1 | 3/2009 | Stewart et al. | |
| 7,536,471 B2* | 5/2009 | Oliver et al. | 709/232 |
| 7,680,757 B2* | 3/2010 | Wolff et al. | 706/59 |
| 7,712,134 B1* | 5/2010 | Nucci et al. | 726/23 |
| 7,805,518 B1* | 9/2010 | Kamvar et al. | 709/227 |
| 7,809,826 B1* | 10/2010 | Guruswamy | 709/224 |
| 8,234,705 B1* | 7/2012 | Roskind et al. | 726/22 |
| 2002/0199096 A1 | 12/2002 | Wenocur et al. | 713/153 |
| 2003/0044020 A1 | 3/2003 | Aboba et al. | 380/278 |
| 2003/0115251 A1* | 6/2003 | Fredrickson et al. | 709/201 |
| 2003/0182421 A1* | 9/2003 | Faybishenko et al. | 709/224 |
| 2003/0204742 A1* | 10/2003 | Gupta et al. | 713/200 |
| 2003/0226033 A1* | 12/2003 | Zinda et al. | 713/201 |
| 2004/0236874 A1* | 11/2004 | Largman et al. | 710/8 |
| 2004/0246910 A1* | 12/2004 | McDermott et al. | 370/254 |
| 2005/0010767 A1* | 1/2005 | Craft | 713/168 |
| 2005/0027713 A1 | 2/2005 | Cameron et al. | 707/100 |
| 2005/0036616 A1 | 2/2005 | Huang et al. | 380/255 |
| 2005/0053000 A1* | 3/2005 | Oliver et al. | 370/231 |
| 2005/0067493 A1* | 3/2005 | Urken | 235/386 |
| 2005/0086300 A1 | 4/2005 | Yeager et al. | 709/204 |

(Continued)

FOREIGN PATENT DOCUMENTS

| | | |
|---|---|---|
| EP | 1248438 | 10/2002 |
| EP | 1259045 | 11/2002 |

OTHER PUBLICATIONS

Yu Bin, Munindar Singh, Sycara Katia, Developing trust in large scale Peer to Peer system, Dec. 1, 2004, 2004 IEEE sysmposium, pp. 1-9.*

(Continued)

*Primary Examiner* — Nathan Flynn
*Assistant Examiner* — Viral Lakhia
(74) *Attorney, Agent, or Firm* — Patent Capital Group (57) ABSTRACT

A system, method and computer program product are provided. In use, votes from a plurality of nodes for node categorization are monitored. Further, a pattern associated with the votes is identified. Thus, malicious nodes may be identified based on the pattern.

18 Claims, 5 Drawing Sheets

U.S. PATENT DOCUMENTS

| | | | |
|---|---|---|---|
| 2005/0163061 A1* | 7/2005 | Piercey et al. | 370/255 |
| 2005/0193226 A1* | 9/2005 | Ahmed et al. | 714/4 |
| 2005/0229250 A1* | 10/2005 | Ring et al. | 726/23 |
| 2005/0256960 A1* | 11/2005 | Ganesh et al. | 709/229 |
| 2006/0026242 A1* | 2/2006 | Kuhlmann et al. | 709/206 |
| 2006/0112146 A1* | 5/2006 | Song et al. | 707/200 |
| 2006/0136721 A1* | 6/2006 | Bruestle et al. | 713/168 |
| 2006/0215575 A1* | 9/2006 | Horton et al. | 370/252 |
| 2006/0242684 A1* | 10/2006 | Russell et al. | 726/1 |
| 2007/0005797 A1* | 1/2007 | Fontijn et al. | 709/238 |
| 2007/0006313 A1* | 1/2007 | Porras et al. | 726/24 |
| 2007/0016822 A1* | 1/2007 | Rao et al. | 714/4 |
| 2007/0124803 A1* | 5/2007 | Taraz | 726/4 |
| 2007/0226777 A1* | 9/2007 | Burton et al. | 726/2 |
| 2007/0226796 A1* | 9/2007 | Gilbert et al. | 726/22 |
| 2008/0196087 A1* | 8/2008 | Ranjit | 726/5 |
| 2009/0112989 A1* | 4/2009 | Anderson et al. | 709/204 |

OTHER PUBLICATIONS

Gligor VD, On the Distribution and Revocation of cryptographic keys in senson networks, Jul. 2005, IEEE, vol. 2, pp. 4-7.*

A. Wierzbicki et al., "A New Authentication Protocol for Revocable Anonymity in Ad-Hoc Networks", arXiv:cs.CR/0510065 vl 22 Oct. 2005.

Y. Hu et al., "Ariadne: A Secure on-Demand Routing Protocol for Ad Hoc Networks", MobiCom '02, Sep. 23-26, 2002.

Skype Explained, P2P Telephony Explained, http://www.skype.com/products/explained.html.

* cited by examiner

|    | A  | B  | C  | D  | E  | M1 | M2 |
|----|----|----|----|----|----|----|----|
| A  |    | WL | WL |    | BL | BL |    |
| B  | WL |    | WL |    |    | BL | BL |
| C  | WL |    |    | WL |    | BL |    |
| D  |    |    | WL |    | WL |    | BL |
| E  | WL | WL |    |    |    |    | BL |
| M1 | BL |    |    |    | BL |    | WL |
| M2 |    | WL |    | BL | BL | WL |    |

FIGURE 4A

|    | A  | B  | C  | D  | E  | M1 | M2 |
|----|----|----|----|----|----|----|----|
| A  |    | WL |    | WL |    | BL | BL |
| B  | WL |    | WL |    |    | BL | BL |
| C  | WL | WL |    |    |    | BL |    |
| D  |    | WL | WL |    |    | BL | BL |
| E  | WL | WL |    |    |    |    | BL |
| M1 | BL | WL | BL |    |    |    | WL |
| M2 | BL | WL | BL |    |    | WL |    |

SYSTEM, METHOD AND COMPUTER PROGRAM PRODUCT FOR BEHAVIORAL PARTITIONING OF A NETWORK TO DETECT UNDESIRABLE NODES

FIELD OF THE INVENTION

The present invention relates to identifying undesirable nodes, and more particularly to using voting as a way of identifying undesirable nodes.

BACKGROUND

With the advent of general access computer networks, such as the Internet, people may now easily exchange data between computer systems. Unfortunately, some people have taken advantage of such easy data exchange by developing various threats, such as viruses, and accessing data for which such people are unauthorized.

One exemplary environment where such problem is particularly exacerbated includes peer-to-peer networks. Peer-to-peer networks are a reflection of the real world, especially when it comes to trust. One does not necessarily trust everyone with whom he/she interacts, and different levels of trust exist. Hence, some nodes in a peer-to-peer network may be malicious, and there may be scenarios in which one would like to black list such a node to safeguard other nodes and the network in general.

Black listing nodes helps prevents the following scenarios (as well as many other scenarios):
1) Sharing of data and/or code that is malicious (e.g. where the data and/or code is not the same as that originally represented, etc.);
2) Spreading of viruses, worms, malware, shareware, and/or any program which is not desirable per policy; and
3) Attacks such as a denial-of-service (DoS) from within a network.

Of course, the foregoing benefits are contingent on the fact that malicious nodes are first black listed properly. Unfortunately, it is often difficult to identify appropriate nodes for black listing purposes. There is thus a need for overcoming these and/or other problems associated with the prior art.

SUMMARY

A system, method and computer program product are provided. In use, votes from a plurality of nodes for node categorization are monitored. Further, a pattern associated with the votes is identified. Thus, undesirable nodes may be identified based on the pattern.

DETAILED DESCRIPTION

Figure 1:
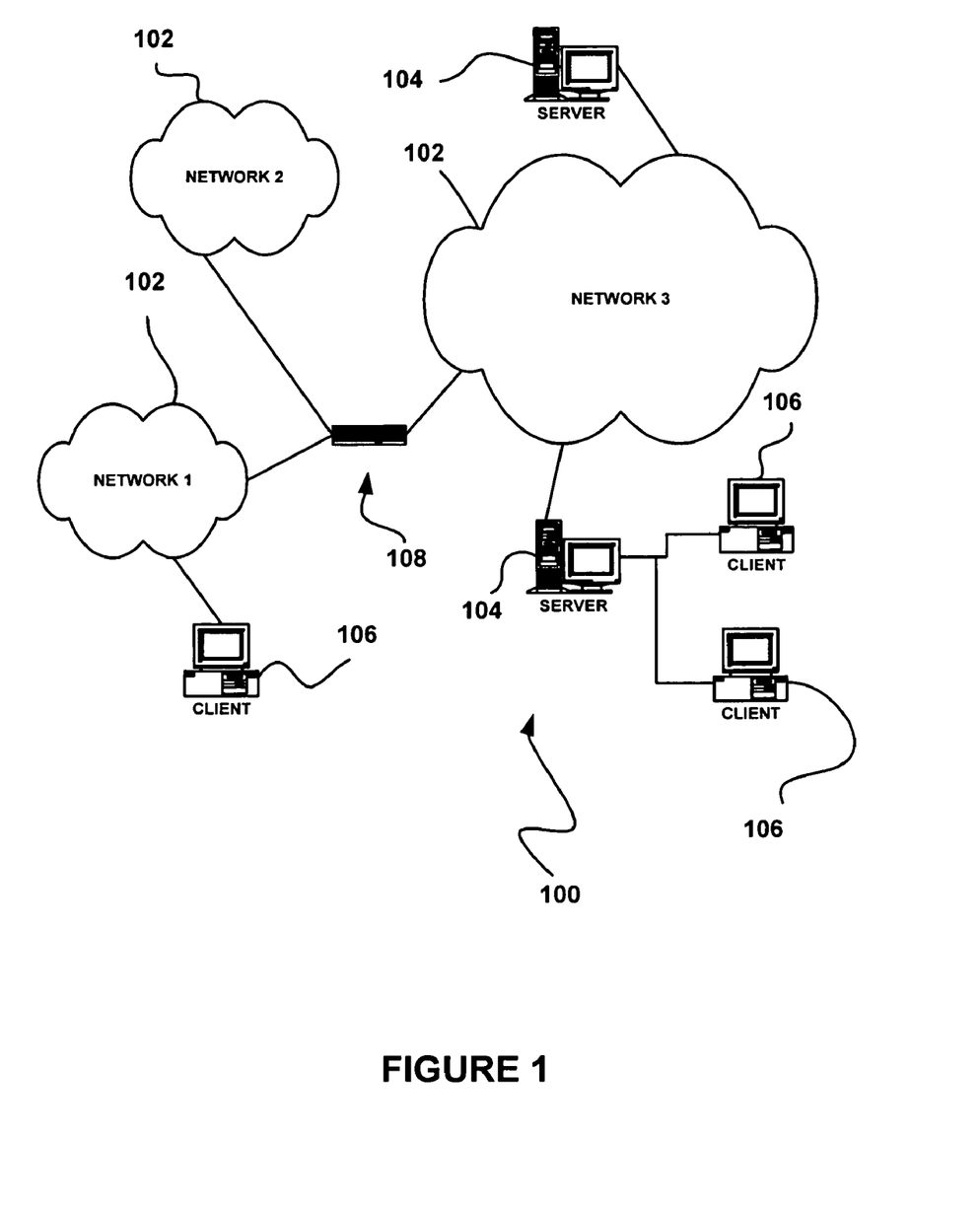
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

In the context of the present description, a peer-to-peer network is a network created between two or more nodes on an as-needed, sometimes temporary, basis. An important difference between peer-to-peer networks and traditional networks is the lack of substantial central administration and/or control over network principals.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

Figure 2:
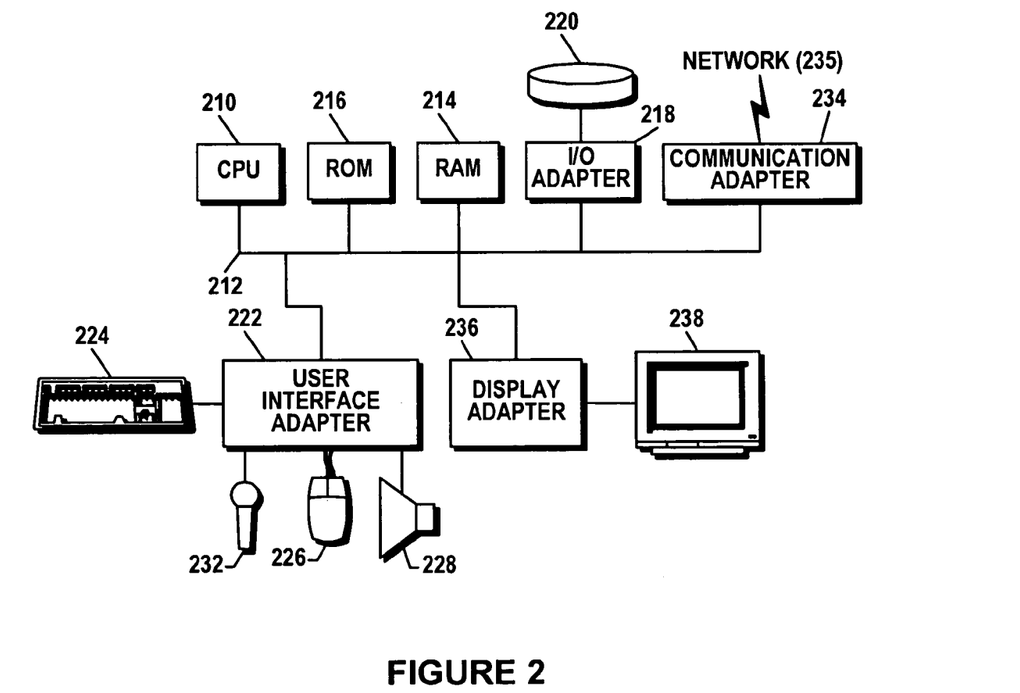
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
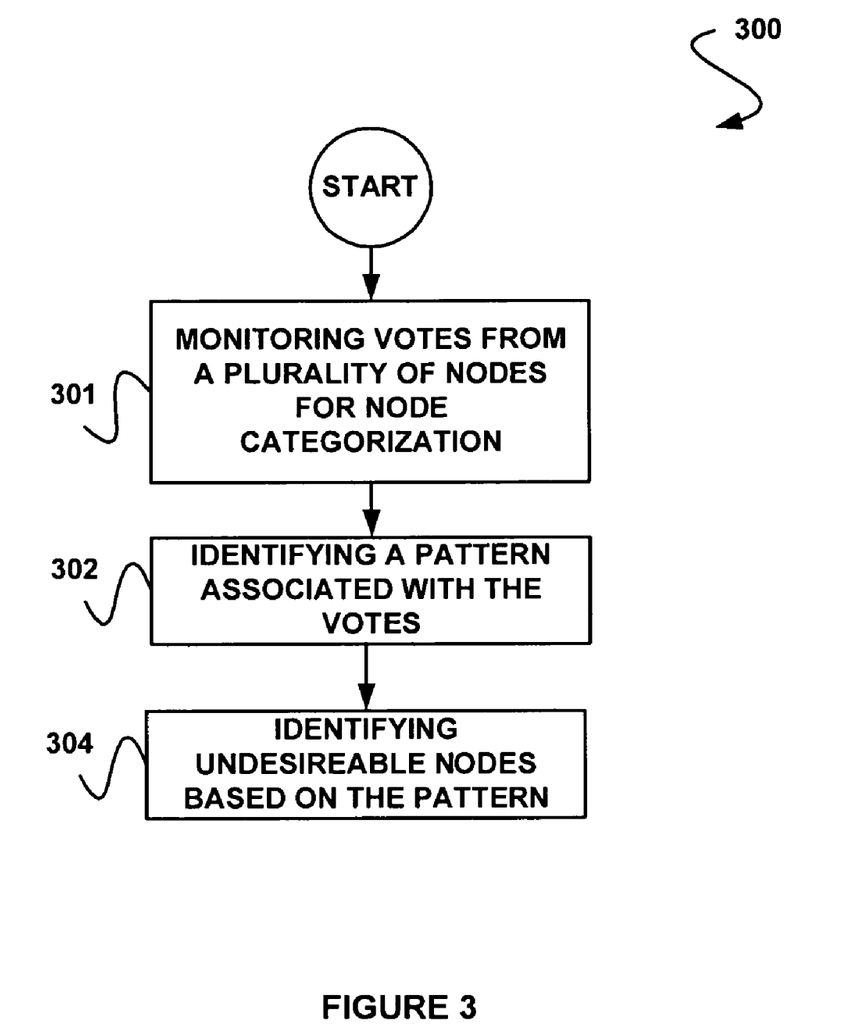
FIG. 3 shows a method for identifying undesirable nodes, in accordance with one embodiment.

FIG. 3 shows a method 300 for identifying undesirable nodes, in accordance with one embodiment. As an option, the method 300 may be implemented in the context of the architecture and environment of FIGS. 1 and/or 2. Of course, however, the method 300 may be carried out in any desired environment.

As shown, in operation 301, votes from a plurality of nodes for node categorization are monitored. In the context of the present description, the term vote may refer to any input received from a node that indicates or implies any sort of preference, decision, opinion, disposition, or the like of such node. Still yet, the node categorization may refer to any operation that results in any particular node(s) being categorized into one or more groups. Even still, a node may include any computer (e.g. see, for example, the computers 104, 106 of FIG. 1, etc.), an account, and/or a human user thereof.

In one exemplary embodiment, the node categorization may optionally include the categorization of nodes as black listed nodes and/or white listed nodes. In the context of the present description, such black listing may include a preclusion of network communication with one or more nodes designated as such, a withdrawal of code/data access rights, and/or any type of action that reflects an undesirable nature of such node(s). Conversely, the white listing may include the allowance of network communication with one or more nodes designated as such, a granting of code/data access rights, and/or any type of action that reflects a desirable nature of such node(s). To this end, such functionality may be carried out by a firewall, a policy management system, and/or any other computer (or component thereof) capable of node categorization.

In yet another illustrative embodiment, the monitoring of operation 301 may involve monitoring the votes during multiple voting sessions. For example, each voting session may involve votes submitted by a plurality of the nodes relating to a newly added node, votes relating to any node which has been the subject of recent interactions among existing nodes and about which an opinion is to be provided, and/or votes relating to any other event (or random, periodic, user/administrator-determined, etc.), that results in at least one cast vote. More optional information regarding such an optional embodiment will be set forth during reference to subsequent figures.

Of course, the monitoring may be accomplished in any desired manner. Just by way of example, upon a node casting a vote, such vote may be communicated via a network (e.g. see, for example, the networks 102 of FIG. 1, for example, etc.) to a central administrator, server or the like, where votes may be collected and monitored. As yet another option, such central mechanism may optionally be that which also administers the categorization (e.g. black/white listing, etc.) functionality. A distributed embodiment is also contemplated, as well as any in-band or out-of-band mechanism. Of course, it should be noted that the votes may be monitored in any manner that allows a pattern associated with the votes to be identified.

With reference again to FIG. 3, a pattern associated with the votes is identified, as indicated in operation 302. In one optional embodiment, such pattern may include one or more similarities amongst the votes, differences amongst the votes, and/or any other patterns that are capable of being identified. Of course, such pattern may be identified by comparing the votes, and/or any other technique capable of identifying such patterns.

Thus, in operation 304, undesirable nodes may be identified based on the pattern. In the context of the present description, such undesirable node may include any node with at least one associated aspect that is undesired by the voting node. Of course, such undesirable node may be identified in any desired manner. In one extreme embodiment, such undesirable nodes may include malicious nodes that propagate malware and/or engage in hacking activities.

Just by way of example, in one exemplary embodiment, the undesirable nodes may be identified by first grouping the nodes into groups based on the pattern. For instance, the nodes with similar votes may be grouped together (e.g. the nodes with a predetermined threshold of similar votes may be grouped, nodes may be grouped using more complex rules that operate as function of similarities/differences amongst votes, etc.). Of course, once grouped, the undesirable nodes may then be identified in any desired manner. In one embodiment, upon one of nodes in one of the groups being black/white listed, all of the nodes of the black/white listed group may be black/white listed.

More illustrative information will now be set forth regarding various optional architectures and features with which the foregoing technique may or may not be implemented, per the desires of the user. Specifically, more information will be set forth regarding one exemplary embodiment which may incorporate the above method 300 to identify malicious nodes that may otherwise go unidentified.

It should be strongly noted that the following information is set forth for illustrative purposes and should not be construed as limiting in any manner. Any of the following features may be optionally incorporated with or without the exclusion of other features described in and out of a security-related context.

Figure 4A:
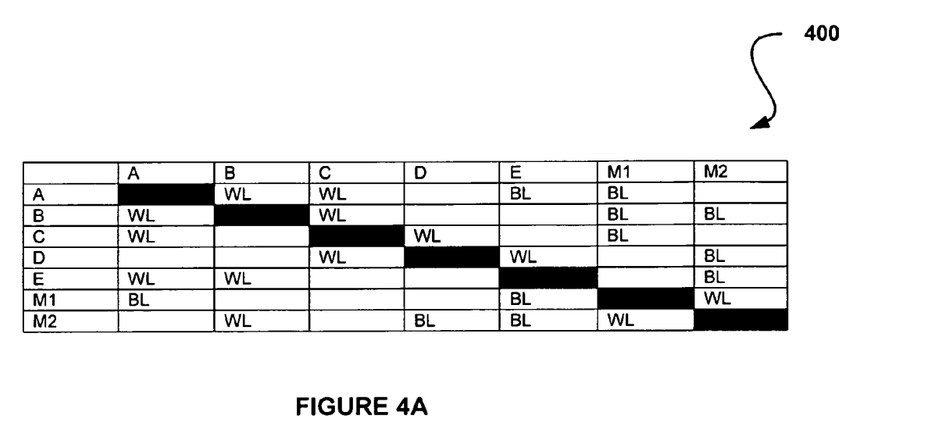
FIGS. 4A-4B show data structures reflecting results of a first and second voting session, respectively, in accordance with another embodiment.
Figure 4B:
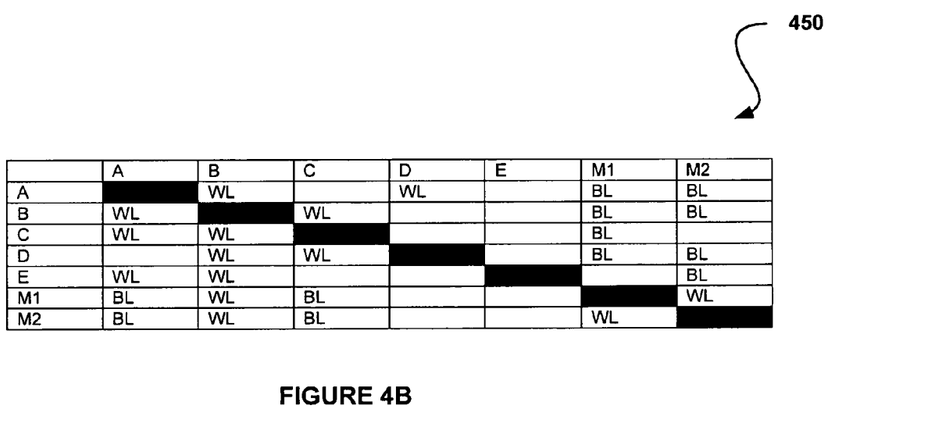

FIGS. 4A-4B show data structures 400, 450 reflecting results of a first and second voting session, respectively, in accordance with another embodiment. As an option, the voting results of data structures 400, 450 may be monitored in the context of the architecture and environment of FIGS. 1-3. Of course, however, they may be used in any desired environment. Further, the aforementioned definitions may equally apply to the description below.

The data structures 400, 450 reflect voting involving seven (7) nodes in a network. Of course, such votes may be monitored in any desired manner (e.g. see, for example, operation 301 of FIG. 3, etc.). As will soon become apparent, the nodes include two (2) malicious nodes M1, M2, and five (5) non-malicious nodes A, B, C, D, and E. Table 400 reflects a first voting session where each row represents a vote for black listing (BL), white listing (WL), or a lack thereof with respect to one or more of the other nodes listed in the columns.

To this end, patterns may be detected amongst the votes. Specifically, in the present embodiment, the votes of each of the nodes may be compared to those of the other nodes to identify similarities and/or difference, so that they may be grouped.

In the context of the present embodiment, a similarity may refer to a situation where two nodes both indicate that a particular other node is either black listed or white listed. Further, a difference may refer to a situation where one node indicates that a particular other node is either black listed or white listed, and a second node indicates an opposite result with respect to such particular other node (e.g. black vs. white listed or visa-versa).

Table 1 illustrates a result of such a comparison, using the votes illustrated in FIG. 4A. For clarity and brevity purposes, only comparisons involving nodes C, M1, and M2 are set forth below. Further, it should be noted that the numbers below indicate a "net" result after summing the similarities and differences. Still yet, every node, by default, white lists (WL) itself; thus, the black boxes in FIGS. 4A and 4B each constitutes a default WL.

TABLE 1

| Comparison of C with respect to other nodes |
|---|
| A and C have 3 similarity(ies) |
| B and C have 3 similarity(ies) |
| D and C have 2 similarity(ies) |
| E and C have 1 similarity(ies) |
| M1 and C have 2 difference(s) |
| M2 and C have 2 difference(s) |

TABLE 1-continued

Comparison of M1 with respect to other nodes

A and M1 have 1 difference(s)
B and M1 have 3 difference(s)
C and M1 have 2 difference(s)
D and M1 have 2 difference(s)
E and M1 have 3 difference(s)
M2 and M1 have 3 similarity(ies)

Comparison of M2 with respect to other nodes

A and M2 have 1 similarity(ies)
B and M2 have 1 difference(s)
C and M2 have 2 difference(s)
D and M2 have 3 difference(s)
E and M2 have 1 difference(s)
M1 and M2 have 3 similarity(ies)

After the initial voting session, it may or may not be possible to conclude that any of the nodes reside in a particular group. For example, a predetermined number of similarities and/or differences may be required to exist for proper grouping. In the present example, it may be clearly concluded that node C does not reside in the same group as nodes M1 and M2. Further, M1 and M2 may be grouped together, if there is sufficient evidence in a subsequent voting session(s) of them voting in a similar fashion. Still yet, it may be concluded that nodes A, B, C, D and E do not behave like M1 or M2 substantially enough to group them.

Thereafter, another voting session may be initiated. Of course, such additional voting session may be prompted in any desired manner. For example, in the present example, such voting session may be prompted by a need to re-vote based on a change in nodes, and/or by a change in the way the nodes interact with each other in a next session prior to the next voting round.

Table 2 illustrates a result of such a comparison, using the votes illustrated in FIG. 4B. For clarity and brevity purposes, only comparisons involving node C is set forth below.

TABLE 2

Comparison of C with respect to other nodes

A and C have 3 similarity(ies)
B and C have 4 similarity(ies)
D and C have 3 similarity(ies)
E and C have 2 similarity(ies)
M1 and C have 2 difference(s)
M2 and C have 2 difference(s)

As a result of such voting session, it may be still not be possible to conclude as to whether any of the nodes are in the same group as node C. Further, more voting sessions may be required to group the remaining ungrouped nodes, namely nodes A, B, C, D, and E.

However, it may be clear that node M1 and node M2 are in the same group, since they behave sufficiently similar. Of course, this similarity may be quantified in any desired manner. Just by way of example, in the present instance, node M1 and node M2 may be included in the same group based on a predetermined exemplary algorithm, namely both nodes include a threshold of (e.g. 1 or more, etc.) differences with respect to a common node (e.g. node C) during both voting sessions, when, during such same voting sessions, the remaining nodes include similarities with respect to such node. In other embodiments, node M1 and node M2 may be included in the same group based on the fact that they have a threshold number (e.g. 5 or more, etc.) of similarities in voting, etc. Of course, the various groups may be altered, refined, updated, etc. based on each subsequent voting session.

Once various nodes are group together correctly, it may be possible to black list malicious nodes in a group with similar malicious behavior. Specifically, upon one of the nodes in one of the groups being black listed, all of the nodes of the black listed group may be black listed. As an option, various automated and/or manual techniques may be used to differentiate from cases where one node in a group is attacked and starts behaving maliciously (differently) from the remaining members of the group, so that black listing of non-malicious nodes is avoided.

Figure 5:
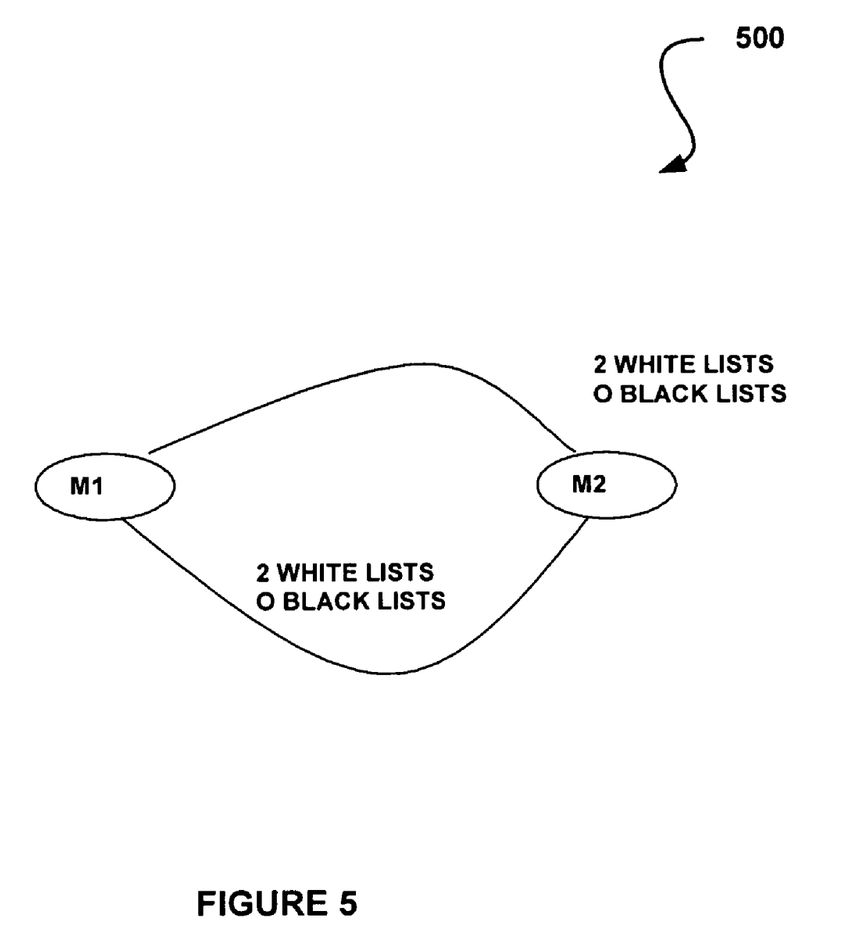
FIG. 5 shows a graph reflecting results of a voting session, in accordance with another embodiment.

FIG. 5 shows a graph 500 reflecting results of a voting session, in accordance with another embodiment. As an option, the graph 500 may be generated in the context of the architecture and environment of FIGS. 1-4. Of course, however, they may be used in any desired environment. Further, the aforementioned definitions may equally apply to the description below.

In use, the present graph 500 may be used to arrive at a conclusion similar to that associated with FIGS. 4A-4B. This may be accomplished, for example, by illustrating nodes which surpass a threshold of similarities. As a further option, such similarities may be included in the graph 500 and one or more links may be shown tying such nodes together.

Thus, rather than just relying on a voting process in a given time period, one embodiment may observe a pattern of voting nodes and partition the network such that malicious nodes are put into one group, and non-malicious nodes are put into a different group. To this end, once such groups are established, one may be able to black list all colluding nodes such that only genuinely non-malicious nodes may be allowed to remain in the network, etc.

This is accomplished since, when a malicious node (or a network of malicious nodes) exists in the network over a period of time involving multiple voting sessions, such malicious nodes may tend to form a partitioned network, where each votes to white list other malicious nodes in the network and/or tries to black list non malicious nodes. Such groups (e.g. partitions, etc.) in the network may be determined by the behavior of the voting of these nodes in these partitions. Nodes with similar patterned behavior may be grouped together into a partition and these partitions may be refined over iterations of voting sessions.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing malware from executing, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:

monitoring votes from a plurality of nodes for node categorization;

identifying a pattern associated with the votes;

identifying undesirable nodes based on the pattern associated with the votes, wherein the node categorization includes identifying at least some of the undesirable nodes as malicious nodes being associated with propagation of malware, and wherein the malicious nodes are provided on a black list; and implementing a policy at a firewall that precludes communication with the malicious nodes provided on the black list and that withdrawals data access rights for the malicious nodes provided on the black list, wherein a network is partitioned for the malicious nodes based on the pattern, and wherein partitions that include the malicious nodes are refined over iterations of subsequent voting sessions involving the plurality of nodes.

2. The method of claim 1, wherein the votes categorize at least some of the plurality of nodes as white listed nodes.

3. The method of claim 1, wherein monitoring includes monitoring the votes during multiple voting sessions.

4. The method of claim 3, wherein each voting session involves votes submitted by a plurality of the nodes relating to a newly added node, or to interactions between existing nodes.

5. The method of claim 1, wherein the undesirable nodes are identified by grouping at least some of the plurality of nodes into groups based on the pattern associated with the votes.

6. The method of claim 5, wherein at least some of the plurality of nodes with similar votes are grouped together.

7. The method of claim 6, wherein at least some of the plurality of nodes with a predetermined threshold of similar votes are grouped together.

8. The method of claim 5, whereupon one of nodes in one of the groups being black listed, all of the nodes of the group are black listed.

9. The method of claim 5, whereupon one of nodes in one of the groups being white listed, all of the nodes of the group are white listed.

10. The method of claim 1, wherein at least some of the plurality of nodes includes at least one of users, accounts, and computers.

11. The method of claim 1, wherein the votes are submitted by at least some of the plurality of nodes utilizing a network.

12. The method of claim 1, wherein at least some of the plurality of nodes are members of a peer-to-peer network.

13. The method of claim 1, wherein, for each possible pair of nodes in the plurality of nodes, the pattern associated with the votes is identified by comparing votes between the pair of nodes to identify the similarities amongst the votes and the differences amongst the votes.

14. The method of claim 13, wherein the comparing includes summing the similarities amongst the votes and the differences amongst the votes to calculate a net result.

15. The method of claim 1, wherein a pair of nodes in the plurality of nodes are grouped together where the pair of nodes both include a threshold number of differences with respect to a common node during a plurality of voting sessions, when, during the voting sessions, remaining nodes in the plurality of nodes include similarities with respect to the common node.

16. The method of claim 1, wherein network communication is allowed to nodes categorized as white listed nodes.

17. A computer program product embodied on a non-transitory computer readable medium for performing operations, comprising:

monitoring votes from a plurality of nodes for node categorization;

identifying a pattern associated with the votes;

identifying undesirable nodes based on the pattern associated with the votes, wherein the node categorization includes identifying at least some of the undesirable nodes as malicious nodes being associated with propagation of malware, and wherein the malicious nodes are provided on a black list; and implementing a policy at a firewall that precludes communication with the malicious nodes provided on the black list and that withdrawals data access rights for the malicious nodes provided on the black list, wherein a network is partitioned for the malicious nodes based on the pattern, and wherein partitions that include the malicious nodes are refined over iterations of subsequent voting sessions involving the plurality of nodes.

18. A system, comprising:

a processor, wherein the system is configured for:

monitoring votes from a plurality of nodes for node categorization;

identifying a pattern associated with the votes;

identifying undesirable nodes based on the pattern associated with the votes, wherein the node categorization includes identifying at least some of the undesirable nodes as malicious nodes being associated with propagation of malware, and wherein the malicious nodes are provided on a black list; and implementing a policy at a firewall that precludes communication with the malicious nodes provided on the black list and that withdrawals data access rights for the malicious nodes provided on the black list, wherein a network is partitioned for the malicious nodes based on the pattern, and wherein partitions that include the malicious nodes are refined over iterations of subsequent voting sessions involving the plurality of nodes.

* * * * *